United States Patent
Yoshihira et al.

(10) Patent No.: US 6,349,953 B1
(45) Date of Patent: Feb. 26, 2002

(54) STRUCTURE OF SUSPENSION MOUNTING PORTION AND ASSEMBLING METHOD THEREOF

(75) Inventors: Noboru Yoshihira, Kanagawa; Kitaru Sone, Tokyo, both of (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/500,796

(22) Filed: Feb. 10, 2000

(30) Foreign Application Priority Data

Feb. 10, 1999 (JP) .......................... 11-033283

(51) Int. Cl.[7] .......................... B60G 7/00; B62D 25/20; B62D 21/02
(52) U.S. Cl. .................. 280/124.19; 280/781; 280/800; 280/797; 280/788; 296/204; 296/203.04
(58) Field of Search ................. 280/788, 781, 280/800, 797, 124.109; 296/204, 195, 203.04; 180/311, 312

(56) References Cited

U.S. PATENT DOCUMENTS 5,938,220 A * 8/1999 Torneld ....................... 280/788

FOREIGN PATENT DOCUMENTS

| JP | 403028009 A | * | 2/1991 | ................. 280/788 |
|---|---|---|---|---|
| JP | 403132410 A | * | 6/1991 | ................. 280/788 |
| JP | 404046874 A | * | 2/1992 | ................. 280/781 |
| JP | 404090975 A | * | 3/1992 | ................. 280/788 |
| JP | 404090976 A | * | 3/1992 | ................. 280/788 |
| JP | 404215565 A | * | 8/1992 | ................. 280/788 |
| JP | 409207823 A | * | 8/1997 | |

* cited by examiner

Primary Examiner—Lanna Mai
Assistant Examiner—Ruth Ilan
(74) Attorney, Agent, or Firm—McDermott, Will & Emery

(57) ABSTRACT

A structure of a suspension mounting portion of the invention is provided with a side member which extends in a longitudinal direction of a vehicle and is connected to a lower surface of a floor panel, a closed cross sectional portion which is formed by use of the floor panel and the side member, a suspension bolt which mounts a suspension system constituting element to a lower side of the closed cross sectional portion, a first mounting surface which is provided by use of a recess portion formed on a bottom wall of the side member and mounts the suspension bolt, a reinforce which is provided to an inner portion of the closed cross sectional portion, and a second mounting surface which is provided to the reinforce and mounts the suspension bolt. The suspension system constituting element is mounted to the lower side of the closed cross sectional portion by the suspension bolt fixed through the first mounting surface and the second mounting surface.

9 Claims, 8 Drawing Sheets

STRUCTURE OF SUSPENSION MOUNTING PORTION AND ASSEMBLING METHOD THEREOF

BACKGROUND OF THE INVENTION

The present invention relates to a structure of a suspension mounting portion and an assembling method of the suspension mounting portion, and particularly to a structure of a suspension mounting portion of a vehicle such as an automotive vehicle and the like and an assembling method of the suspension mounting portion.

In general, the structure of the suspension mounting portion of the automotive vehicle and the like requires accurately, positioning a suspension system assembled therein and having sufficient strength and rigidity. Then, a structure suitable for manufacturing processes in a mass production line is also required for the structure of the suspension mounting portion mentioned above, and it is of course necessary to satisfy a requirement in view of a cost, a weight and the like.

Figure 8:
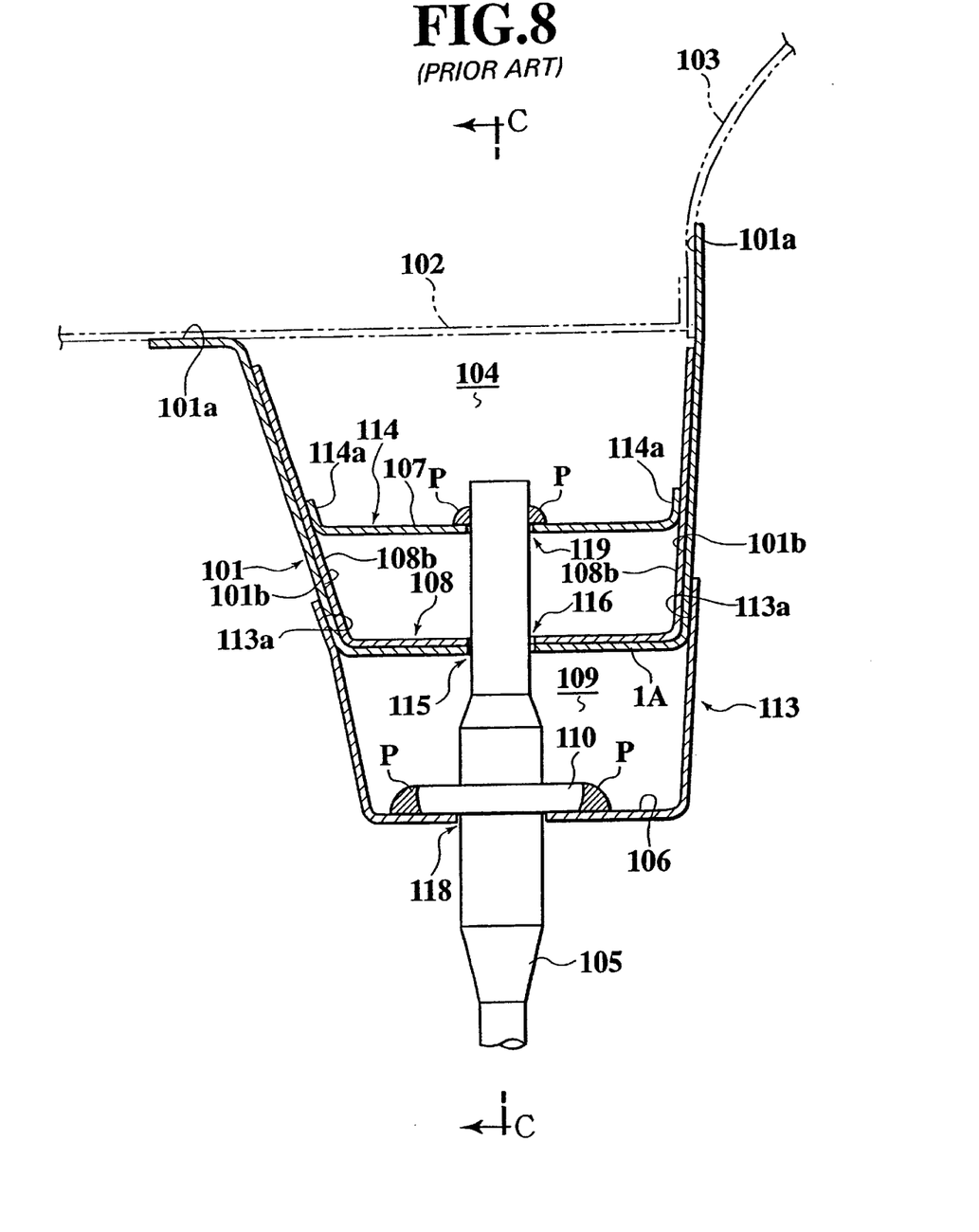
FIG. 8 is a cross sectional view corresponding to FIG. 2 which shows a suspension mounting portion in accordance with a consideration of the inventors of the present invention.
Figure 9:
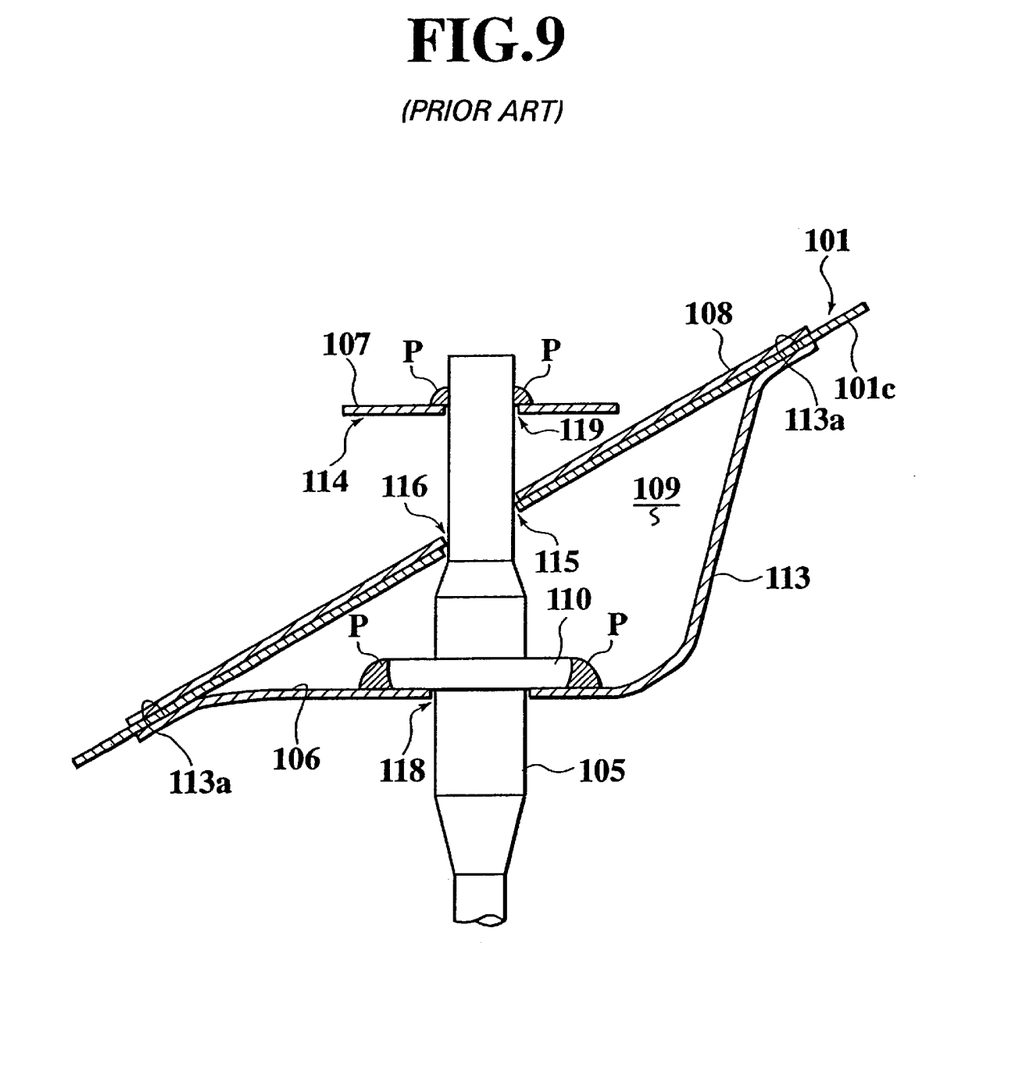
FIG. 9 is a cross sectional view along a line C—C in FIG. 8.

In accordance with considerations of the inventors of the present invention, there is exemplified a structure of a suspension mounting portion shown in FIGS. 8 and 9.

In FIGS. 8 and 9, reference numeral 101 denotes a frame member in a longitudinal direction of a vehicle, that is, a rear side member having a main cross section formed in a hat shape.

The rear side member 101 is structured such that a flange 101a in an upper edge thereof is joined to a lower surface of a rear floor panel 102. On the contrary, in a side portion of the vehicle, the upper edge flange 101a is joined to an end portion of a wheel house inner 103 corresponding to a frame member in a rear side portion of the vehicle together with the rear floor panel 102. As mentioned above, a closed cross sectional portion 104 is formed by the rear side member 101 and the floor panel 102.

Reference numeral 105 denotes a suspension bolt which is fixed to the closed cross sectional portion 104 and mounts a suspension bracket (not shown) to a lower side of the closed cross sectional portion 104. A mounting portion 110 is provided in a center portion of the suspension bolt 105.

Reference numeral 113 denotes a lower bracket having a first mounting surface 106 for mounting the suspension bolt 105. The lower bracket 113 is structured such that peripheral edge flanges 113a thereof are joined to an outer side wall 101b and a lower surface 101c of the rear side member 101.

Reference numeral 114 denotes an upper bracket having a second mounting surface 107 for mounting an upper end portion of the suspension bolt 105. The upper bracket 114 is structured such that peripheral edge flanges 114a thereof are joined to a reinforce 108 inserted into the rear side member 101 so as to be abutted on a bottom wall 101A of the rear side member 101 along an inner side thereof.

In the structure mentioned above, particular assembling process of the suspension bolt 105 are as follows.

At first, the suspension bolt 105 is inserted into a bolt insertion hole 118 of the lower bracket 113 and the mounting portion 110 of the suspension bolt 105 is fixed to a first mounting surface 106 of the lower bracket 113 by means of a welding P such as a projection welding and the like.

In the meantime, the reinforce 108 and the upper bracket 114 are sub-assembled.

Next, the rear side member 101 and the lower bracket 113 are joined to each other while inserting the upper portion of the suspension bolt 105 from a bolt insertion hole 115 provided in the rear side member 101.

Next, the reinforce 108 and the upper bracket 114 which are integrally formed in accordance with the sub-assembly are joined to the rear side member 101 while successively inserting the upper portion of the suspension bolt 105 into a bolt insertion hole 116 provided in the reinforce 108 and a bolt insertion hole 119 provided in the upper bracket 114.

Next, the upper end portion of the suspension bolt 105 is fixed to the second mounting surface 107 provided in the upper bracket 114 by means of the projection welding P or the like.

As in the manner mentioned above, the suspension bracket is fixed to the lower side of the closed cross sectional portion 104 by the suspension bolt 105 extending and fixed through the first mounting surface 106 and the second mounting surface 107.

SUMMARY OF THE INVENTION

However, even in accordance with the structure mentioned above, the structure is complex, a number of the assembling processes is excessive and a cost therefore is increased.

Further, since the number of the parts is excessive such as the lower bracket 13, the upper bracket 14 and the like, a man-hour for managing the parts and a weight becomes much.

Accordingly, an object of the present invention is to provide a structure of a suspension mounting portion which can achieve both of making a weight of a vehicle light and improving a supporting rigidity of a suspension system, and an assembling method thereof.

The structure of the suspension mounting portion in accordance with the present invention is provided with a side member which extends in a longitudinal direction of a vehicle and is connected to a lower surface of a floor panel, a closed cross sectional portion which is formed by use of the floor panel and the side member, a suspension bolt which mounts a suspension system constituting element to a lower side of the closed cross sectional portion, a first mounting surface which is provided by use of a recess portion formed on a bottom wall of the side member and mounts the suspension bolt, a reinforce which is provided to an inner portion of the closed cross sectional portion, and a second mounting surface which is provided to the reinforce and mounts the suspension bolt. The suspension system constituting element is mounted to the lower side of the closed cross sectional portion by use of the suspension bolt fixed through the first mounting surface and the second mounting surface.

On the contrary, an assembling method of a suspension mounting portion in accordance with the present invention comprises steps of inserting an end portion of a suspension bolt to a bolt insertion hole formed on a first mounting surface of a side member, fixing the suspension bolt to the first mounting surface, inserting the other end portion of the suspension bolt to a bolt insertion hole provided in a reinforce, fitting the reinforce to an inner side of the side member, and fixing the other end portion of the suspension bolt to a second mounting surface provided in the reinforce. In this case, the structure is made such that the side member extends in a longitudinal direction of the vehicle and is connected to the lower surface of the floor panel, and the first mounting surface is provided by use of a recess portion of the side member. Then, a suspension system constituting element is mounted to a closed cross sectional portion formed by use of the floor panel and the side member, by means of the suspension bolt fixed through the first mounting surface and the second mounting surface.

DETAILED DESCRIPTION OF THE PREFERRED EMBODIMENTS

Embodiments in accordance with the present invention will be in detail described below with reference to the accompanying drawings.

At first, with reference to FIGS. 1 to 3, a description will be given of a structure of a suspension mounting portion and an assembling method thereof in accordance with a first embodiment of the present invention.

Figure 1:
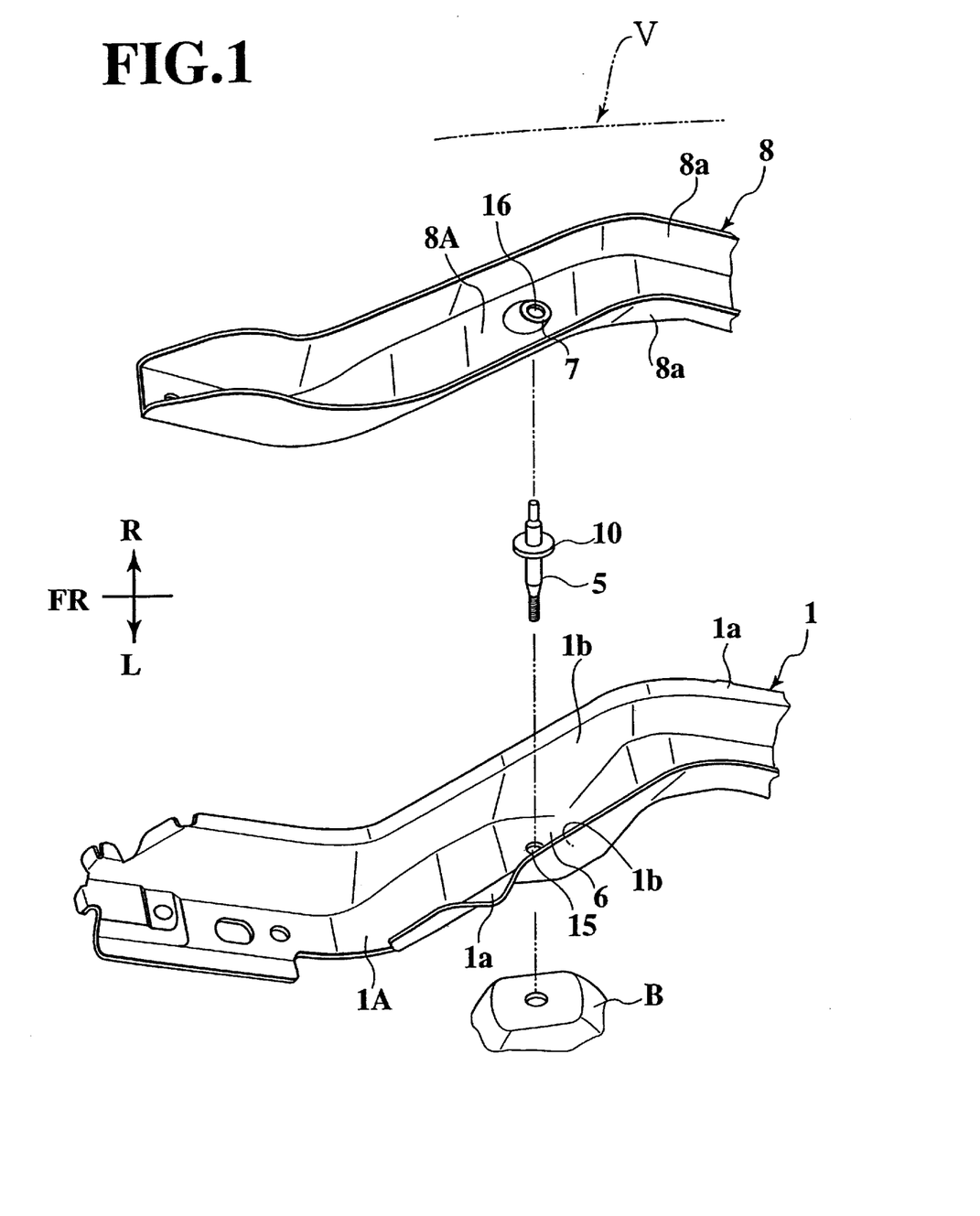
FIG. 1 is an exploded perspective view which shows a suspension mounting portion and an assembling method thereof in accordance with a first embodiment of the present invention.
Figure 2:
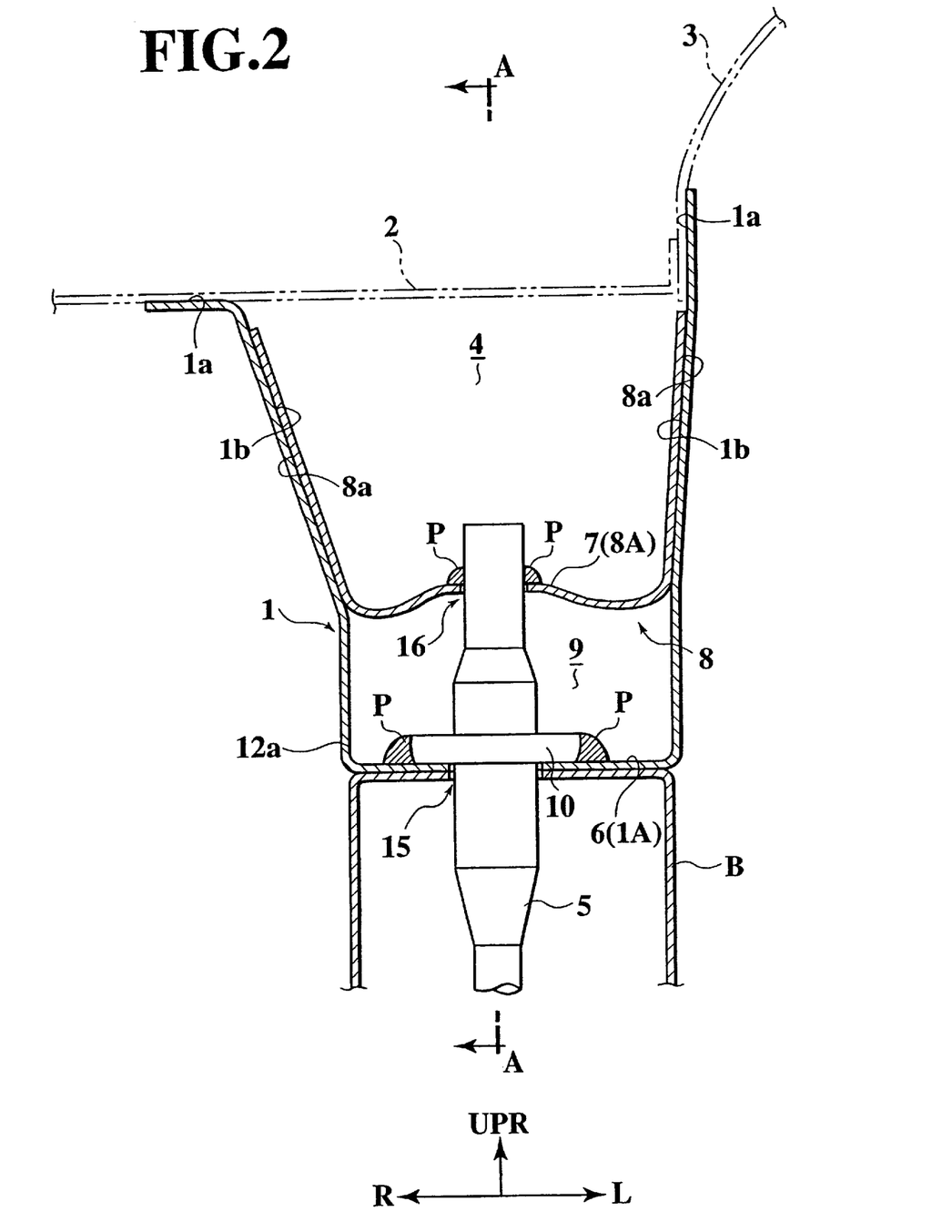
FIG. 2 is a vertical cross sectional view as seen from a front portion of a vehicle which shows the suspension mounting portion in accordance with the embodiment.
Figure 3:
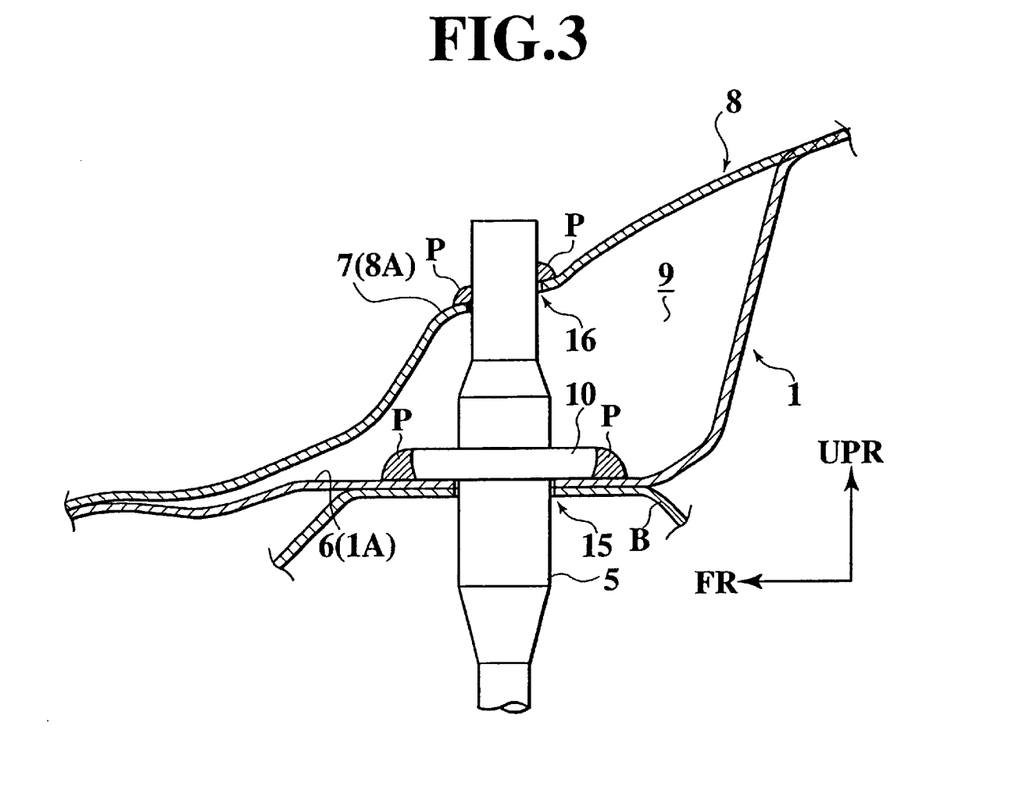
FIG. 3 is a cross sectional view along a line A—A in FIG. 2.

In FIGS. 1 to 3, reference symbol FR denotes a front portion of a vehicle V, reference L denotes a left portion of the vehicle V, reference symbol R denotes a right portion of the vehicle V and reference symbol UPR denotes an upper portion of the vehicle V.

Reference numeral 1 denotes a frame member in a longitudinal direction of the vehicle V, which is a rear side member having a main cross section formed in a hat shape.

The rear side member 1 is structured such that an upper surface of a flange 1a in an upper edge thereof is joined to a lower surface of a rear floor panel 2. On the contrary, in a side portion of the vehicle V, the upper edge flange 1a is joined to an end portion of a wheel house inner 3 corresponding to a frame member in a rear side portion of the vehicle V together with the rear floor panel 2. As mentioned above, a closed cross sectional portion 4 is formed by use of the rear side member 1 and the floor panel 2.

Reference numeral 5 denotes a suspension bolt which is fixed to the closed cross sectional portion 4 and mounts a suspension bracket B to a lower side of the closed cross sectional portion 4. A disc-like mounting portion 10 is provided in a center portion of the suspension bolt 5.

A bottom wall 1A of the rear side member 1 is provided with a first mounting surface 6 for fixing the mounting portion 10 of the suspension bolt 5 by utilizing a convex portion provided by forming a part of the bottom wall 1A substantially in a recess shape.

On the contrary, reference numeral 8 denotes a reinforce having a second mounting surface 7 for fixing the suspension bolt 5. The reinforce 8 is provided so as to be fitted to the rear side member 1 from an inner side. That is, a second closed cross sectional portion 9 is formed between the rear side member 1 and the reinforce 8 by joining an outer wall 8a thereof to an inner wall 1b of the rear side member 1.

The second mounting surface 7 mentioned above is provided by utilizing a convex portion obtained by forming a bottom wall 8A of the reinforce 8 substantially in a convex shape.

In the structure mentioned above, specific mounting process of the suspension bolt 5 in accordance with the present embodiment are as follows.

At first, the lower portion of the suspension bolt 5 is inserted into a bolt insertion hole 15 formed on the first mounting surface 6 of the rear side member 1 and the mounting portion 10 of the suspension bolt 5 is fixed to the first mounting surface 6 by means of a welding P such as a projection welding and the like.

Next, the reinforce 8 is fitted and joined to the inner side of the rear side member 1 while inserting the upper portion of the suspension bolt 5 to a bolt insertion hole 16 provided in the reinforce 8.

Next, the upper end portion of the suspension bolt 5 is fixed to the second mounting surface 7 provided in the reinforce 8 by means of the welding P such as a projection welding or the like.

Finally, a suspension bracket B is fixed to the suspension bolt 5, which extends through the first mounting surface 6 and the second mounting surface 7 and is fixed thereby, in the lower side of the closed cross sectional portion 4.

In accordance with the structure of the present embodiment mentioned above, since the first mounting surface 6 of the suspension bolt 5 is provided by utilizing the recess portion provided in the bottom wall 1A of the rear side member 1, it is possible to make the structure simple and reduce a number of joining points.

Accordingly, it is possible to restrict an increase of a weight and a cost and achieve both of making a weight light and improving a supporting rigidity of a suspension system.

Further, as mentioned above, since the structure is made simple and the number of the parts is reduced, it is possible to reduce a man-hour for managing the parts and restrict an influence of a strain caused by a heat generated by the welding or the like and a dimensional dispersion in the respective parts as little as possible, so that it is possible to attain an improvement of a mounting accuracy.

Further, in accordance with the present embodiment, since the second mounting surface 7 can be provided by utilizing the convex portion provided on the bottom wall 8A of the reinforce 8, it is possible to make the structure simpler and reduce the number of the parts.

That is, in accordance with the present embodiment, as well as it is of course possible to more effectively restrict the increase of the weight and the cost and more effectively make the weight of the vehicle light and improve the supporting rigidity of the suspension system, it is possible to promote a reduction of the man-hour for managing the parts and further improve the mounting accuracy.

Next, a description will be given of a structure of a suspension mounting portion and an assembling method thereof in accordance with a second embodiment of the present invention.

In the structure of the suspension mounting portion in accordance with the present embodiment, the same reference numerals are attached to the same elements as those of the first embodiment, and detail descriptions of their specific structures will be omitted.

Figure 4:
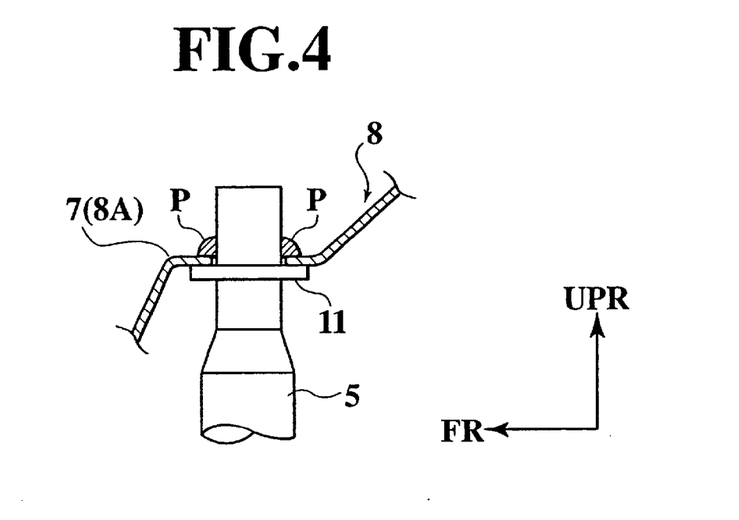
FIG. 4 is a cross sectional view which shows a main portion of a suspension mounting portion in accordance with a second embodiment of the present invention.

A basic structure of the suspension mounting portion in accordance with the present embodiment is the same as that of the first embodiment, however, as can be understood with reference to FIG. 4, it is different from the structure in accordance with the first embodiment in view that the second mounting surface 7 provided by utilizing the convex portion of the reinforce 8 is formed in a horizontal surface and that a collar 11 which is brought into contact with a horizontal lower surface of the second mounting surface 7 is provided in the upper end portion of the suspension bolt 5.

Therefore, in accordance with the structure of the present embodiment, since the second mounting surface 7 is horizontally formed, it is possible to improve a joining performance at a time of joining the second mounting surface 7 to the upper end portion of the suspension bolt 5 by the projection welding P or the like.

Further, in accordance with the present embodiment, since there is also provided the collar 11 which is brought into contact with the lower surface of the second mounting surface 7, it is possible to accurately position the suspension bolt 5 at a time of assembling by means of the collar 11, and further increase an assembling operability.

Next, a description will be given of a structure of a suspension mounting portion and an assembling method thereof in accordance with a third embodiment of the present invention.

Also in the structure of the suspension mounting portion in accordance with the present embodiment, the same reference numerals are attached to the same elements as those of the first embodiment, and detail descriptions of their specific structures will be briefly performed.

Figure 5:
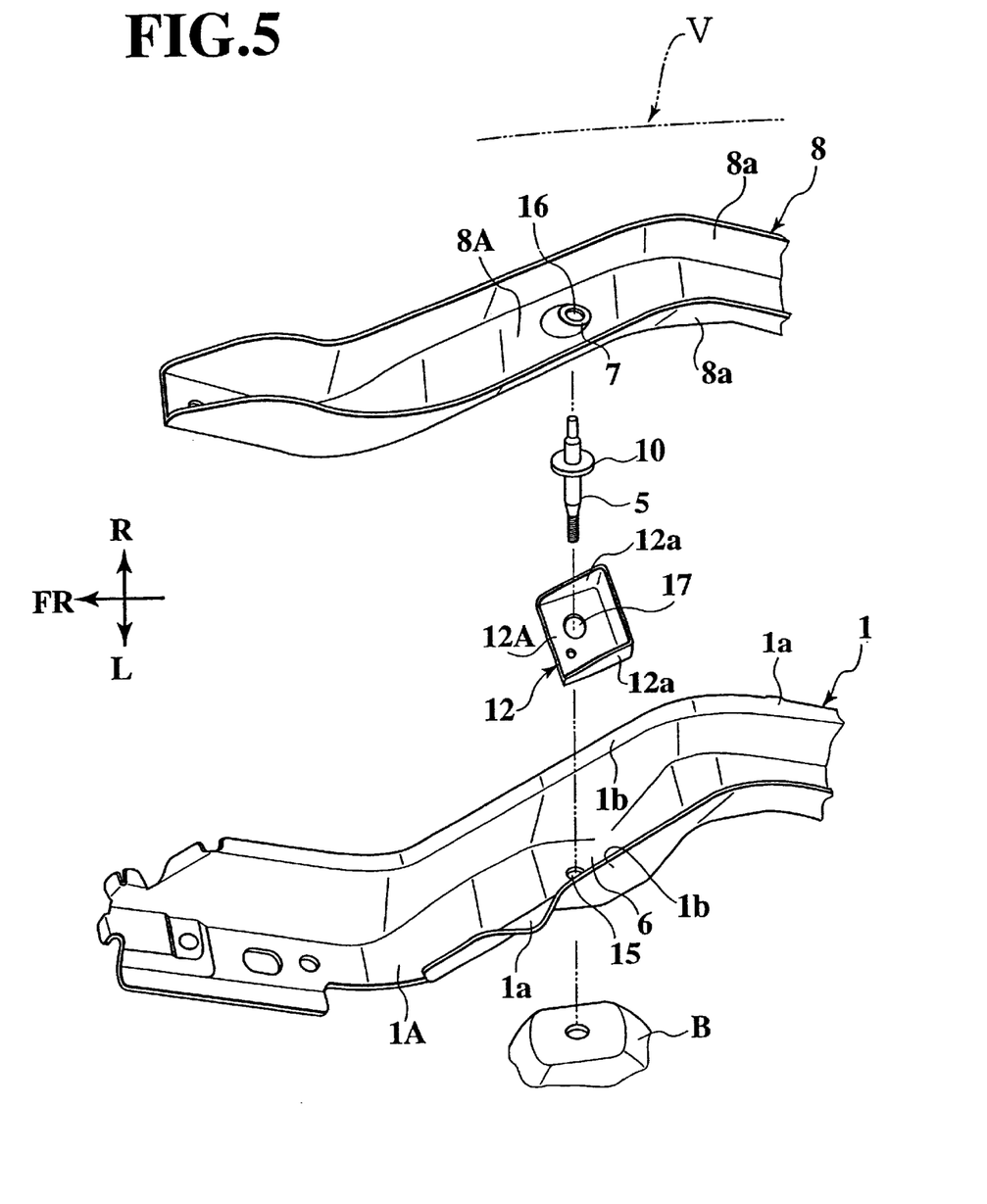
FIG. 5 is an exploded perspective view which shows a suspension mounting portion and an assembling method thereof in accordance with a third embodiment of the present invention.
Figure 6:
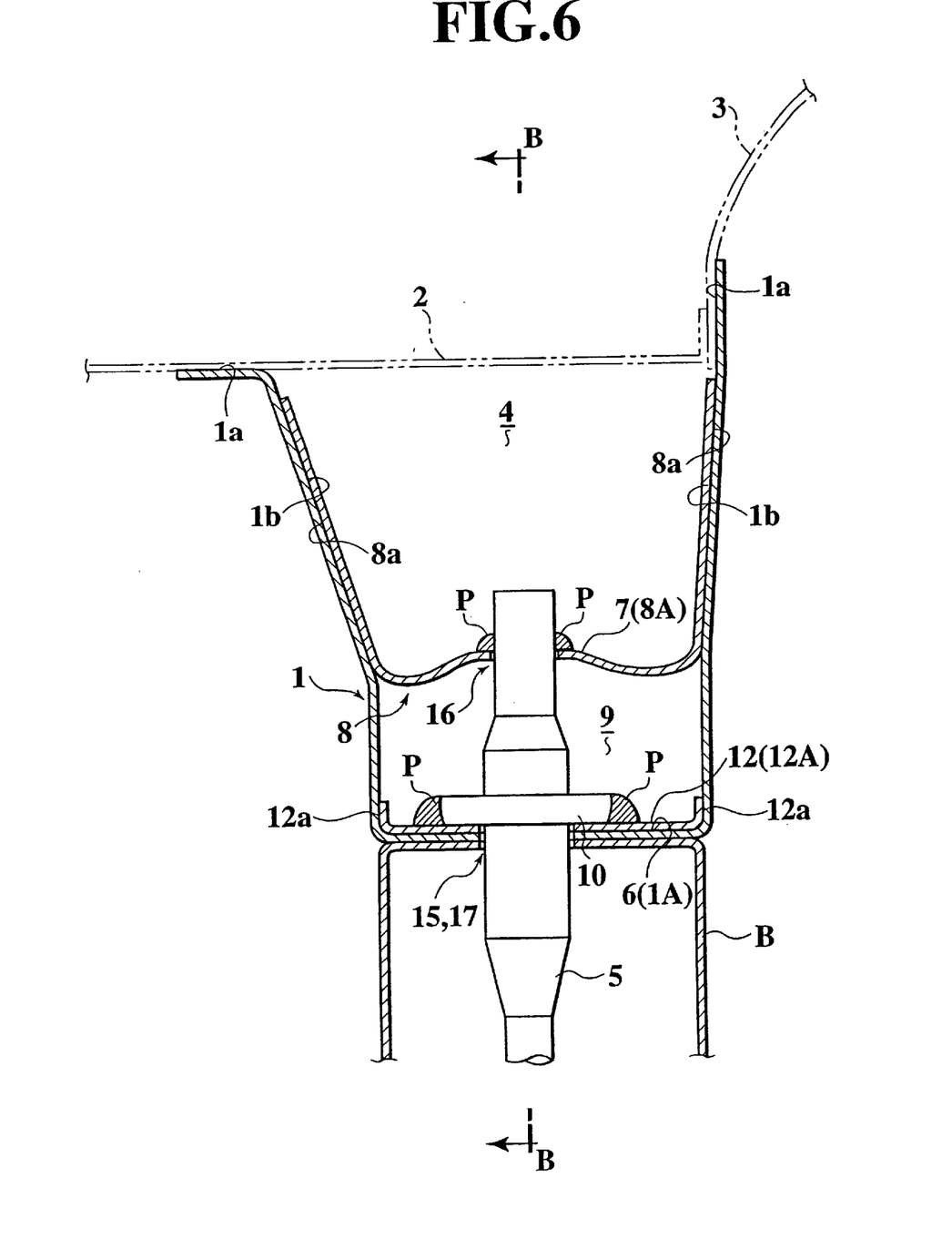
FIG. 6 is a cross sectional view corresponding to FIG. 2 in accordance with the embodiment.
Figure 7:
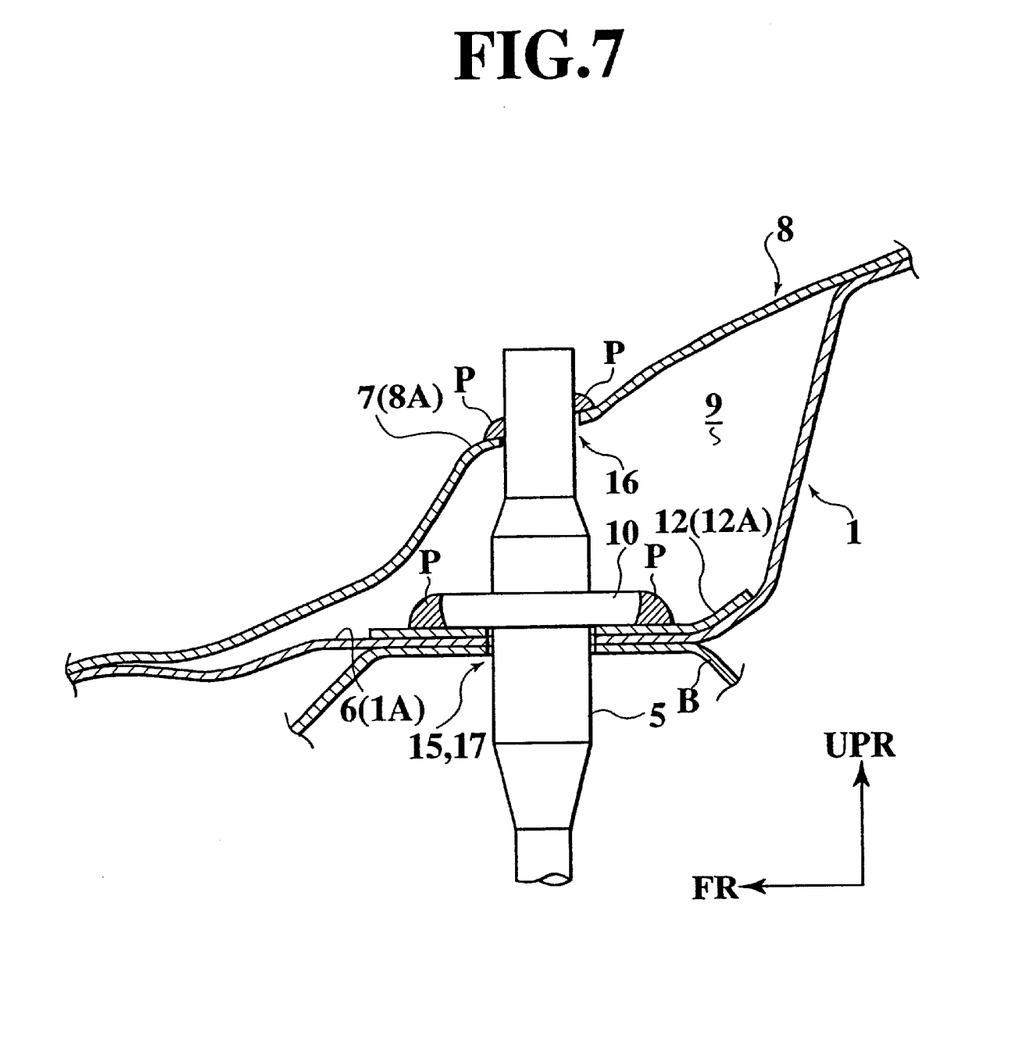
FIG. 7 is a cross sectional view along a line B—B in FIG. 6.

A basic structure of the structure of the suspension mounting portion in accordance with the present embodiment is the same as that of the first embodiment, however, as can be understood with reference to FIGS. 5 to 7, they are different in view that a reinforcing plate 12 is provided on the first mounting surface 6.

Particularly speaking, the reinforcing plate 12 is laid over the first mounting surface 6 provided on the bottom wall 1A of the rear side member 1, and a peripheral edge flange 12a of the reinforcing plate 12 is joined to the inner wall of the rear side member 1.

At a time of assembling the suspension bolt 5, at first, the mounting portion 10 provided in the suspension bolt 5 is fixed to an upper surface 12A of the reinforcing plate 12 by means of a projection welding P or the like while inserting the lower end portion of the suspension bolt 5 to the bolt insertion hole 15 provided on the first mounting surface 6 of the rear side member 1 and a bolt insertion hole 17 provided in the reinforcing plate 12.

Next, in the same manner as that of the first embodiment, the reinforce 8 is fitted and joined to the inner side of the rear side member 1 while inserting the upper portion of the suspension bolt 5 to the bolt insertion hole 16 provided in the reinforce 8.

Next, the upper end portion of the suspension bolt 5 is fixed to the second mounting surface 7 provided in the reinforce 8 by means of the projection welding P or the like.

Through the processes mentioned above, the suspension bolt 5 is provided so as to extend through the first mounting surface 6 and the second mounting surface 7, and finally the suspension bracket B is mounted to the lower side of the closed cross sectional portion 4.

In accordance with the structure of the present embodiment mentioned above, since the reinforcing plate 12 is provided on the first mounting surface 6, in addition to the effects of the first embodiment, it is possible to increase the supporting rigidity of the suspension bolt 5 on the first mounting surface 6 and improve the supporting rigidity of the suspension.

In this case, in the present embodiment, the embodiment in which the reinforcing plate 12 is provided in the structure of the first embodiment is representatively shown, however, the reinforcing plate 12 can be also applied to the second embodiment in the same manner.

Further, in the embodiments mentioned above, the description was given of the structure of the rear suspension system, however, the present invention can be also applied to a front suspension system in the same manner.

Further, in the embodiments mentioned above, the description was given of the structure of mounting the suspension bracket to the suspension bolt, however, it is possible to mount the other constituting element of the suspension system as occasion demands.

The entire contents of a Patent Application No. TOKUGANHEI 11-33283, with a filing date of Feb. 10, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A structure of a suspension mounting portion comprising:
   a side member extending in a longitudinal direction of a vehicle and connected to a lower surface of a floor panel;
   a closed cross sectional portion formed by use of the floor panel and the side member;
   a suspension bolt mounting a suspension system constituting element to a lower side of the closed cross sectional portion;
   a first mounting surface provide by use of a recess portion formed on a bottom wall of the side member so as to mount the suspension bolt;
   a reinforce provided to an inner portion of the closed cross sectional portion;
   a second mounting surface provided to the reinforce and having a convex portion so as to mount the suspension bolt, the convex portion protruding in an upward direction of the vehicle and having a substantially circular cross section taken along a horizontal plane of the vehicle,
   wherein the suspension system constituting element is mounted to the lower side of the closed cross sectional portion by use of the suspension bolt fixed through the first mounting surface and the second mounting surface.

2. A structure of a suspension mounting portion according to claim 1, wherein a second closed cross sectional portion is formed between the first mounting surface and the second mounting surface.

3. A structure of a suspension mounting portion according to claim 1, wherein the suspension system constituting element includes a suspension bracket.

4. A structure of a suspension mounting portion according to claim 1, wherein the convex portion is formed on a bottom wall of the reinforce.

5. A structure of a suspension mounting portion according to claim 1, wherein the second mounting surface has a horizontal surface.

6. A structure of a suspension mounting portion according to claim 5, wherein an upper end portion of the suspension bolt has a collar which is brought into contact with the horizontal surface of the second mounting surface.

7. A structure of a suspension mounting portion according to claim 1, wherein a reinforcing plate is provided on the first mounting surface.

8. A structure of a suspension mounting portion according to claim 1, wherein a part of the reinforce corresponding to the second mounting surface is inclined in the longitudinal direction of the vehicle.

9. A suspension mounting structure for a vehicle, the structure comprising:

a side member adapted to be connected to a lower surface of a floor panel of the vehicle such that it extends in a longitudinal direction of the vehicle and such that a closed cross-sectional portion is formed by surfaces of the side member and the floor panel, the side member including a bottom wall, a recess formed in the bottom wall and a first mounting surface defined at least partially by the recess;

a reinforce provided on an inner portion of the closed cross-sectional portion and having a second mounting surface, which has a convex portion protruding upward and having a substantially circular cross-section along a horizontal plane; and a suspension bolt adapted to mount a suspension system element to a lower side of the closed cross-sectional portion, wherein the side member and the reinforce are adapted to receive the suspension bolt such that the suspension bolt is disposed through the side member and the reinforce and mounted against the first and second mounting surfaces.

* * * * *